US012170424B2

(12) United States Patent
Swanger et al.

(10) Patent No.: US 12,170,424 B2
(45) Date of Patent: Dec. 17, 2024

(54) CONTACT OF AN ELECTRICAL CONNECTOR WITH PROTECTION TABS FOR CANTILEVER BEAMS

(71) Applicants: TE Connectivity Services GmbH, Schaffhausen (CH); TE Connectivity Germany GmbH, Bensheim (DE)

(72) Inventors: Nathan William Swanger, Middletown, PA (US); Nicholas Lee Evans, Middletown, PA (US); Neil Franklin Schroll, Middletown, PA (US); Guenther Mumper, Bensheim (DE); John Wesley Hall, Middletown, PA (US); Jochen Brandt, Woert (DE)

(73) Assignees: TE Connectivity Germany GmbH (DE); TE Connectivity Solutions GmbH (CH)

( * ) Notice: Subject to any disclaimer, the term of this patent is extended or adjusted under 35 U.S.C. 154(b) by 126 days.

(21) Appl. No.: 17/399,540

(22) Filed: Aug. 11, 2021

(65) Prior Publication Data

US 2023/0046887 A1 Feb. 16, 2023

(51) Int. Cl.

| | |
|---|---|
| ***H01R 13/642*** | (2006.01) |
| ***H01R 13/6582*** | (2011.01) |
| ***H01R 13/6592*** | (2011.01) |
| *H01R 9/03* | (2006.01) |
| *H01R 9/05* | (2006.01) |

(Continued)

(52) U.S. Cl.

CPC ....... *H01R 13/642* (2013.01); *H01R 13/6582* (2013.01); *H01R 13/6592* (2013.01); *H01R 9/03* (2013.01); *H01R 9/05* (2013.01); *H01R 9/0503* (2013.01); *H01R 9/0527* (2013.01); *H01R 13/64* (2013.01); *H01R 13/648* (2013.01); *H01R 13/658* (2013.01); *H01R 13/6591* (2013.01);

(Continued)

(58) Field of Classification Search

CPC .............. H01R 13/642; H01R 13/6582; H01R 13/6592; H01R 9/03; H01R 9/05; H01R 9/0503; H01R 9/0527; H01R 13/64; H01R 13/648; H01R 13/658; H01R 13/6591; H01R 13/65912; H01R 13/65915

See application file for complete search history.

(56) References Cited

U.S. PATENT DOCUMENTS 7,238,047 B2 7/2007 Saettele et al.
10,224,659 B2 * 3/2019 Pemwieser .............. H01R 4/48

(Continued)

FOREIGN PATENT DOCUMENTS

CN 107534252 A * 1/2018 ............. H01R 13/11
CN 114649704 A 6/2022

(Continued)

OTHER PUBLICATIONS

European Search Report, dated Feb. 3, 2020, 1 page.

(Continued)

*Primary Examiner* — Abdullah A Riyami
*Assistant Examiner* — Justin M Kratt

(57) ABSTRACT

A contact includes a cantilever beam and a protection tab. The cantilever beam extends from a beam connected end to a beam free end along an insertion direction. The protection tab extends from a tab connected end to a tab free end in a direction opposite to the insertion direction. The tab free end is positioned adjacent to the beam free end.

19 Claims, 8 Drawing Sheets

(51) Int. Cl.

| | |
|---|---|
| *H01R 13/64* | (2006.01) |
| *H01R 13/648* | (2006.01) |
| *H01R 13/658* | (2011.01) |
| *H01R 13/6591* | (2011.01) |

(52) U.S. Cl.
CPC .. *H01R 13/65912* (2020.08); *H01R 13/65915* (2020.08)

(56) References Cited

U.S. PATENT DOCUMENTS

| | | | | |
|---|---|---|---|---|
| 10,944,218 | B2 * | 3/2021 | Lödding ............ | H01R 13/6581 |
| 10,978,832 | B1 | 4/2021 | Schroll et al. | |
| 2014/0187105 | A1 | 7/2014 | Zhao et al. | |
| 2019/0074610 | A1 | 3/2019 | Thakare et al. | |

FOREIGN PATENT DOCUMENTS

| | | | | |
|---|---|---|---|---|
| DE | 10 2018 102564 | A1 | 8/2019 | |
| EP | 1746691 | A2 | 1/2007 | |
| EP | 3396791 | A1 * | 10/2018 | ............. H01R 13/18 |
| EP | 3540865 | A1 * | 9/2019 | ............. H01R 13/18 |
| EP | 3783754 | A1 | 2/2021 | |
| EP | 3907830 | B1 | 2/2024 | |
| WO | 2017144069 | A1 | 8/2017 | |
| WO | 2019154788 | A1 | 8/2019 | |

OTHER PUBLICATIONS

Abstract of EP 3396791A1, dated Oct. 31, 2018, 2 pages.

International Search Report Application No., PCT/IB2022/057511 Aug. 11, 2022.

* cited by examiner

CONTACT OF AN ELECTRICAL CONNECTOR WITH PROTECTION TABS FOR CANTILEVER BEAMS

FIELD OF THE INVENTION

The present invention relates to a connector and, more particularly, to a contact of a connector.

BACKGROUND

Electrical connectors have contacts with contact springs that resiliently abut and electrically connect with a mating contact. During mating of the contact with the mating contact, especially if the contact and the mating contact are misaligned during insertion, portions of the mating contact can abut free ends of the contact springs and damage the contact springs, impairing mating and the resultant electrical connection.

Attempts to address the stubbing of the mating contact on the free ends of the contact springs have included forming the contact springs as continuous, non-cantilevered beams. These continuous contact springs, however, are difficult and costly to manufacture, as they complicate or prevent the use of the stamping and forming processes most commonly used for contacts.

SUMMARY

A contact includes a cantilever beam and a protection tab. The cantilever beam extends from a beam connected end to a beam free end along an insertion direction. The protection tab extends from a tab connected end to a tab free end in a direction opposite to the insertion direction. The tab free end is positioned adjacent to the beam free end.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
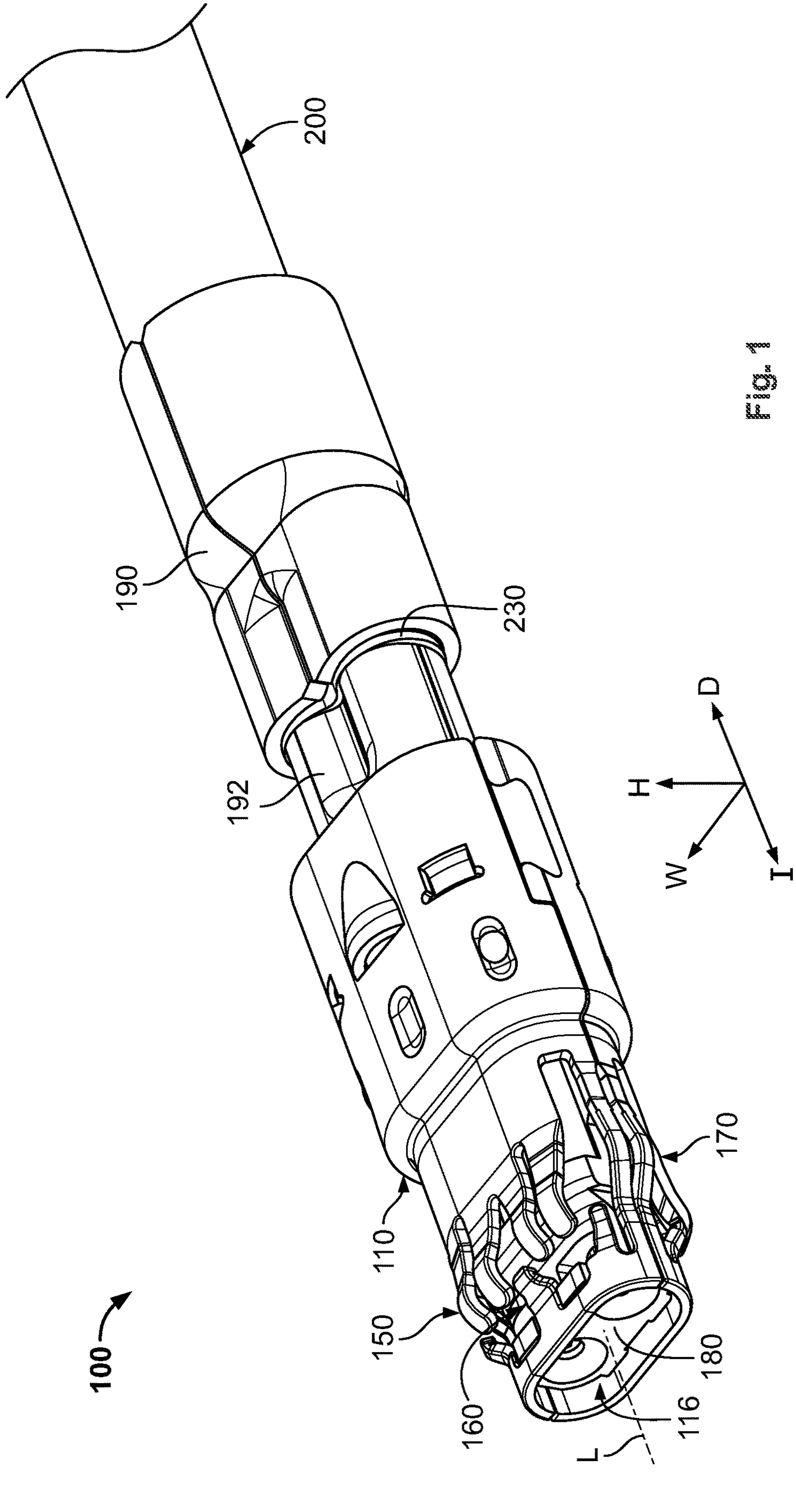
FIG. 1 is a perspective view of a connector according to an embodiment connected to a first cable.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

A connector 100 according to an embodiment will be described with respect to FIGS. 1-5. The connector 100, as shown in FIG. 1, comprises a contact 110, a dielectric housing 180 disposed within the contact 110, an inner ferrule 192 disposed around the dielectric housing 180, and an outer ferrule 190 disposed around the inner ferrule 192. As shown in FIG. 5, the connector 100 includes a plurality of terminals 196 disposed within the dielectric housing 180.

Figure 2:
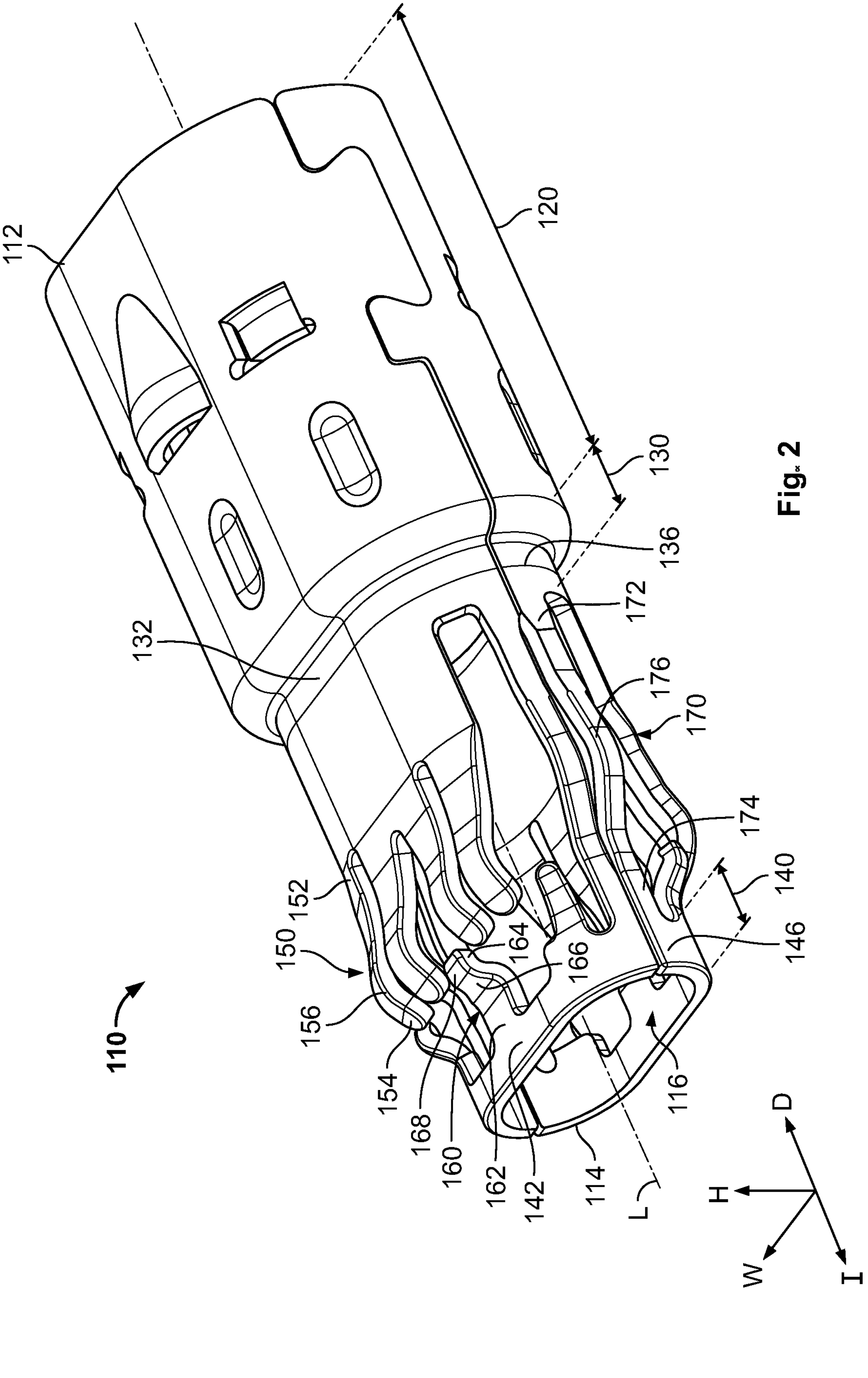
FIG. 2 is a top perspective view of a contact of the connector.
Figure 3:
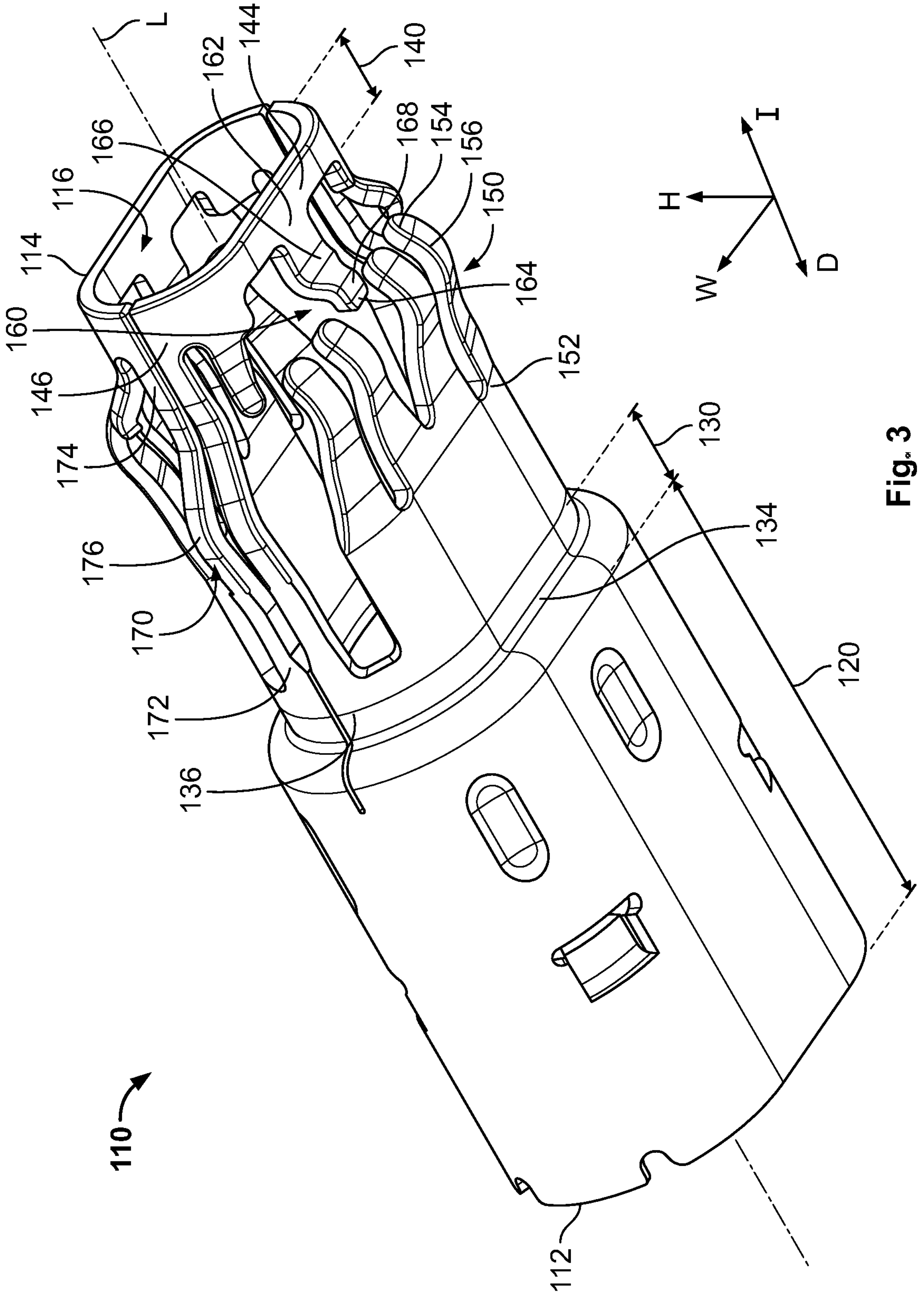
FIG. 3 is a bottom perspective view of the contact.
Figure 4:
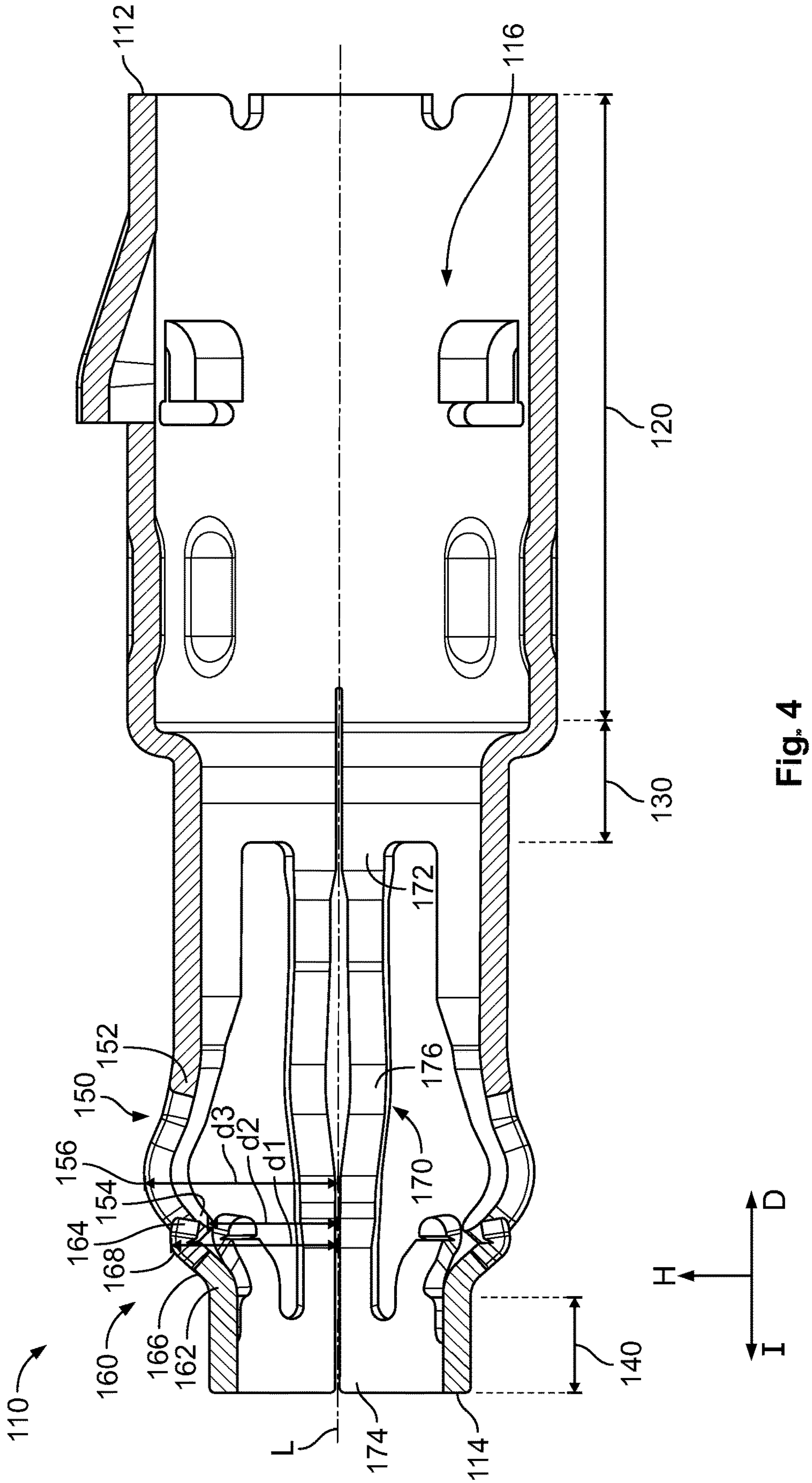
FIG. 4 is a sectional side view of the contact.
Figure 5:
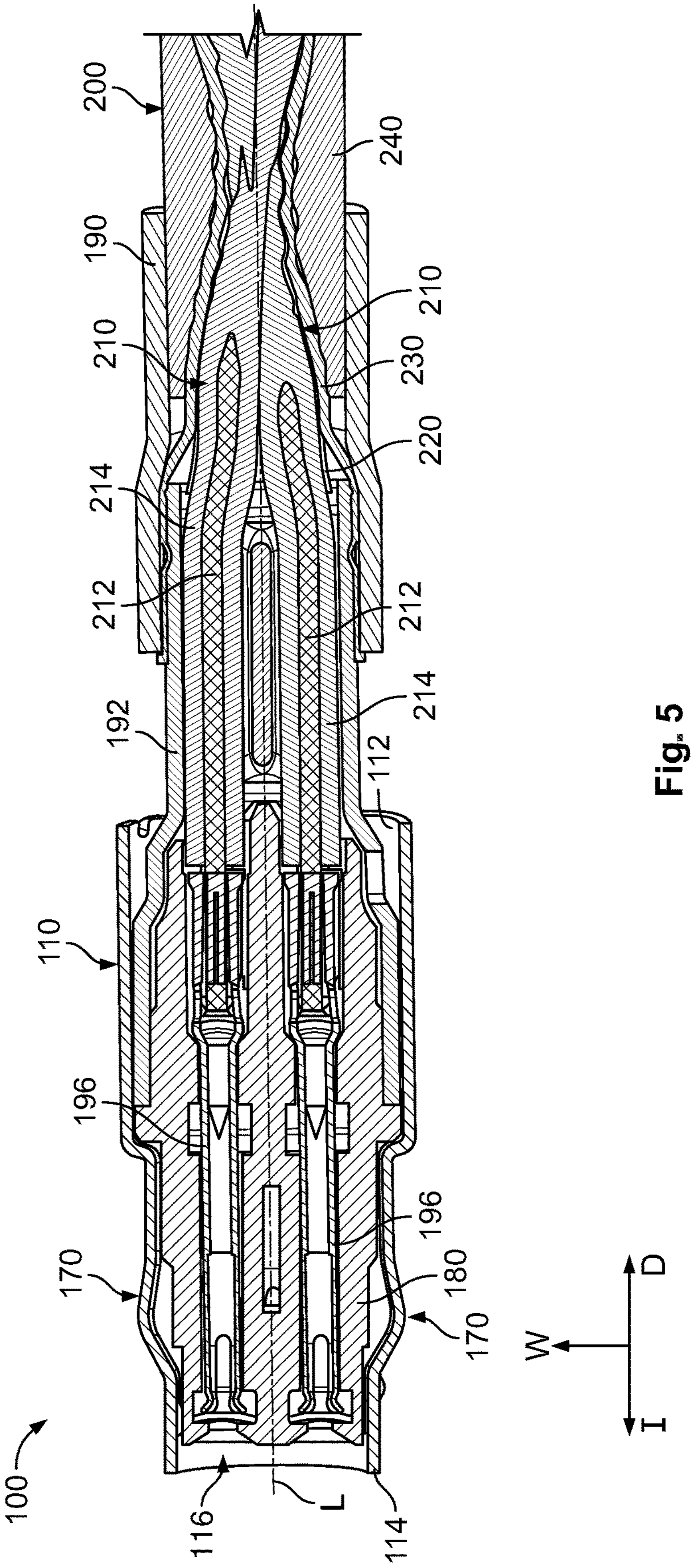
FIG. 5 is a sectional plan view of the connector connected to the first cable.

The contact 110, as shown in FIGS. 2-4, has a base end 112 and a mating end 114 opposite the base end 112 along an insertion direction I. The contact 110 has a base section 120 extending from the base end 112 along the insertion direction I and a transition section 130 extending from the base section 120 along the insertion direction I. The base section 120 and the transition section 130 extend circumferentially around a dielectric housing receiving space 116 defined by the contact 110. A central longitudinal axis L extends centrally through the dielectric housing receiving space 116 along the insertion direction I and along a direction D opposite to the insertion direction I. The base section 120 and the transition section 130 are substantially continuous around and enclose the dielectric housing receiving space 116.

In the shown embodiment, the base section 120 has a substantially constant obround cross-sectional shape along the central longitudinal axis L. The transition section 130 has a same cross-sectional shape as the base section 120, obround in the shown embodiment, and tapers in the insertion direction I from the base section 120 to a smaller cross-sectional shape. In another embodiment, the transition section 130 does not taper and has a same cross-sectional shape and dimension as the base section 120.

The transition section 130, as shown in FIGS. 2 and 3, has a top side 132 and a bottom side 134 opposite the top side 132 in a height direction H perpendicular to the insertion direction I. The transition section 130 has a pair of lateral sides 136 opposite one another in a width direction W perpendicular to the height direction H and the insertion direction I. The lateral sides 136 connect the top side 132 and the bottom side 134 of the transition section 130. In the shown embodiment, the top side 132 and the bottom side 134 are approximately flat and planar, with the height direction H normal to the plane of the top side 132 and the bottom side 134. The lateral sides 136 are curved shapes. In the shown embodiment, the lateral sides 136 are semicircular shapes.

As shown in FIGS. 2-4, the contact 110 has an end section 140 at the mating end 114. The end section 140 has a same cross-sectional shape as the base section 120 and the transition section 130, obround in the shown embodiment. The end section 140 extends circumferentially around the dielectric housing receiving space 116, is substantially continuous around the dielectric housing receiving space 116, and encloses the dielectric housing receiving space 116. The end section 140 has a top side 142 and a bottom side 144 opposite the top side 142 in the height direction H. The end section 140 has a pair of lateral sides 146 opposite one another in the width direction W; the lateral sides 146 connect the top side 142 and the bottom side 144. In the shown embodiment, the top side 142 and the bottom side 144 are approximately flat and planar, with the height direction H normal to the plane of the top side 142 and the bottom side 144. The lateral sides 146 are curved shapes. In the shown embodiment, the lateral sides 146 are semicircular shapes.

The transition section 130 and the end section 140 are separated from one another along the insertion direction I, as shown in FIGS. 2-4. The contact 110 has a plurality of cantilever beams 150 extending from the transition section 130 along the insertion direction I toward the end section 140, a plurality of protection tabs 160 extending from the end section 140 along the direction D opposite to the insertion direction I toward the transition section 130, and a plurality of connected beams 170 extending between and connecting the transition section 130 and the end section 140.

Only one of each of the cantilever beams 150, the protection tabs 160, and the connected beams 170 is labeled in FIGS. 1-4 for clarity of the drawings, however, the reference numbers in the drawings and description herein apply to each of the plurality of similar elements that appear in the figures.

The cantilever beams 150, as shown in FIGS. 2-4, each extend from a beam connected end 152 to a beam free end 154 along the insertion direction I. The beam connected end 152 is connected to the transition section 130 and the cantilever beams 150 extend away from the transition section 130 along the insertion direction I. The term "free end" as used throughout the specification is intended to mean that the end is not connected to another element and is free to move in three dimensions subject to external forces and subject to the structural and material properties of the element having the free end. The cantilever beams 150, due to the cantilever shape having the beam free end 154 and the properties of the material of the contact 110, are resiliently deflectable about the beam connected end 152 toward and away from the central longitudinal axis L, into and out of the dielectric housing receiving space 116.

The cantilever beams 150 each have a cantilever contact portion 156 between the beam connected end 152 and the beam free end 154, as shown in FIGS. 2-4. The cantilever contact portion 156 is formed by a portion of the cantilever beam 150 that is bent away from the dielectric housing receiving space 116. The cantilever contact portion 156 is positioned further from the central longitudinal axis L than the beam connected end 152 and the beam free end 154.

In an embodiment, as shown in FIGS. 2 and 3, a first plurality of cantilever beams 150 extend from the top side 132 of the transition section 130 along the insertion direction I and a second plurality of cantilever beams 150 extend from the bottom side 134 of the transition section 130 along the insertion direction I; the cantilever beams 150 extending from the top side 132 are positioned opposite the cantilever beams 150 extending from the bottom side 134 in the height direction H. In the shown embodiment, four cantilever beams 150 extend from the top side 132 and four cantilever beams 150 extend from the bottom side 134. In other embodiments, three or less or five of more cantilever beams 150 can extend from either of the top side 132 and the bottom side 134.

The protection tabs 160, as shown in FIGS. 2-4, each extend from a tab connected end 162 to a tab free end 164 in the direction D opposite to the insertion direction I. The tab connected end 162 is connected to the end section 140 and the protection tabs 160 extend away from the end section 140 in the direction D. The protection tabs 160 are resiliently deflectable about the tab connected end 162 toward and away from the central longitudinal axis L, into and out of the dielectric housing receiving space 116. In an embodiment, due to the shape and dimensions of the protection tabs 160, the protection tabs 160 are stiffer than the cantilever beams 150 and resist deflection more than the cantilever beams 150.

Each of the protection tabs 160 has a guard portion 168 on an outer surface 166 of the protection tab 160 between the tab connected end 162 and the tab free end 164, as shown in FIGS. 2-4. The guard portion 168 is formed by a bend in the protection tab 160 between the tab connected end 162 and the tab free end 164 that is bent away from the dielectric housing receiving space 116.

In an embodiment, as shown in FIGS. 2 and 3, a first plurality of protection tabs 160 extend from the top side 142 of the end section 140 along the direction D and a second plurality of protection tabs 160 extend from the bottom side 144 of the end section 140 along the direction D. The protection tabs 160 extending from the top side 142 are positioned opposite the protection tabs 160 extending from the bottom side 144 in the height direction H. In the shown embodiment, three protection tabs 160 extend from the top side 142 and three protection tabs 160 extend from the bottom side 144. In other embodiments, two or less or four or more protections tabs 160 can extend from either of the top side 142 and the bottom side 144.

As shown in FIGS. 2-4, the tab free ends 164 of the protection tabs 160 are positioned adjacent to the beam free ends 154 of the cantilever beams 150. In the shown embodiment, with a plurality of each of the cantilever beams 150 and the protection tabs 160, on each of the top side 132, 142 and the bottom side 134, 144, one of the protection tabs 160 is positioned centrally between the cantilever beams 150 in the width direction W and the other protection tabs 160 border the cantilevered beams 150 in the width direction W. The tab free end 164 of one of the protection tabs 160 is positioned between a plurality of beam free ends 154 of the cantilever beams 150 in the width direction W.

As shown in FIG. 4, the guard portion 168 of each of the protection tabs 160 is positioned at a distance d1 from the central longitudinal axis L in the height direction H. The distance d1 is greater that a distance d2 of the beam free end 154 from the central longitudinal axis L in the height direction H; the guard portion 168 is positioned further from the central longitudinal axis L than the beam free end 154 of an adjacent cantilever beam 150. The cantilever contact portion 156 of the cantilever beams 150 is positioned at a distance d3 from the central longitudinal axis L that is greater than the distance d1 and greater than the distance d2; the guard portion 168 is positioned closer to the central longitudinal axis L than the cantilever contact portion 156. The guard portions 168 of each of the protection tabs 160 are positioned in front of the beam free ends 154 of the cantilever beams 150 along the direction D.

The connected beams 170, as shown in FIGS. 2-4, each extend along the insertion direction I and each have a first end 172 connected to the transition section 130 and a second end 174 opposite the first end 172 connected to the end section 140. In the shown embodiment, neither of the first end 172 and the second end 174 is a free end. Each of the connected beams 170 is resiliently deflectable toward and away from the central longitudinal axis L, into and out of the dielectric housing receiving space 116.

The connected beams 170 each have a connected contact portion 176 between the first end 172 and the second end 174, as shown in FIGS. 2-4. The connected contact portion 176 is formed by a bend in the connected beam 170 that is bent away from the dielectric housing receiving space 116. The connected contact portion 176 is positioned further from the central longitudinal axis L than the first end 172 and the second end 174.

In an embodiment, as shown in FIGS. 2 and 3, a pair of connected beams 170 extends between each lateral side 136 of the transition section 130 and one lateral side 146 of the end section 140. The connected beams 170 extending between the opposite lateral sides 136, 146 are positioned opposite one another in the width direction W. In other embodiments, one connected beam 170 or three or more connected beams 170 can extend between each lateral side 136 of the transition section 130 and one lateral side 146 of the end section 140.

The contact 110 is formed of a conductive material. The contact 110, in an embodiment, is monolithically formed in a single piece with the base section 120, the transition section 130, the end section 140, the cantilever beams 150, the protection tabs 160, and the connected beams 170 by stamping and bending. The contact 110 can be stamped and formed from a single contact blank, rather than multiple parts, and does not require complicated forming processes. The form of the cantilever beams 150 allow for independent height adjustment of the cantilever beams 150 in the stamping die.

The dielectric housing 180 of the connector 100, as shown in FIGS. 1 and 5, is disposed in the dielectric housing receiving space 116 of the contact 110. The dielectric housing 180 is formed of an insulative material.

The terminals 196, shown in FIG. 5, are held in the dielectric housing 180. The terminals 196 are formed of a conductive material but are electrically isolated from the contact 110 by the dielectric housing 180. The terminals 196 are receptacle terminals in the shown embodiment. In other embodiments, the terminals 196 could be pin terminals or any other type of terminals used in electrical connectors.

As shown in the embodiment of FIGS. 1 and 5, the inner ferrule 192 is disposed around a portion of the dielectric housing 180 and partially within the dielectric housing receiving space 116. The inner ferrule 192 is formed of a conductive material and is electrically connected to the contact 110. The outer ferrule 190 is disposed around an end of the inner ferrule 192 opposite the contact 110. The outer ferrule 190 is formed of a conductive material and is electrically connected to the contact 110 via the inner ferrule 192.

In the embodiment shown in FIGS. 1 and 5, the connector 100 is connected to a first cable 200. The first cable 200 in the shown embodiment is a shielded twisted pair having a pair of wires 210 twisted around each other. Each of the wires 210 has a conductor 212 and an insulation layer 214 disposed around the conductor 212. The first cable 200 has a foil 220 formed of a conductive material and disposed around the wires 210. In the shown embodiment, the foil 220 is not present at an end of the first cable 200 in a region in which the wires 210 are untwisted and separated from each other. The first cable 200 has a shield 230 formed of a conductive material and disposed around the foil 220 and the wires 210. The shield 230 may also be referred to as a braid. A jacket 240 of the first cable 200, formed of an insulative material, is disposed around the wires 210, the foil 220, and the shield 230. In other embodiments, the first cable 200 can be an unshielded twisted pair, a parallel pair differential cable, or any other type of cable capable of being connected to the connector 100.

As shown in FIG. 5, in a region in which the wires 210 are separated from one another and the jacket 240 is stripped or removed, the wires 210 extend through the inner ferrule 192 and into the dielectric housing 180. The conductor 212 of each of the wires 210 is mechanically and electrically connected to one of the terminals 196 in the dielectric housing 180, for example by crimping. The wires 210 are electrically isolated from the inner ferrule 192 and the contact 110 by the insulation layers 214. The shield 230 is disposed around an outer surface of the inner ferrule 192 and is electrically and mechanically connected to the inner ferrule 192 by the outer ferrule 190. The outer ferrule 190 is disposed around the first cable 200 and the inner ferrule 192 and, in an embodiment, is crimped around the first cable 200 and the inner ferrule 192 to secure the cable 200 and electrically connect the shield 230 to the inner ferrule 192. The shield 230 is electrically connected to the contact 110 through the inner ferrule 192.

A connector system 10 according to an embodiment is shown in FIGS. 6-9. The connector system 10 comprises the connector 100 and a mating connector 300 matable with the connector 100.

The mating connector 300, as shown in FIGS. 6-9, comprises a mating contact 310, a mating dielectric housing 320 disposed within the mating contact 310, a mating inner ferrule 332 disposed around the mating dielectric housing 320, a mating outer ferrule 330 disposed around the mating inner ferrule 332, and a plurality of mating terminals 340 disposed within the mating dielectric housing 320.

The mating contact 310 is formed of a conductive material and has a same cross-sectional shape as the end section 140 of the contact 110. The mating contact 310 forms a mating cavity 318, as shown in FIGS. 6-9. In the shown embodiment, the mating contact 310 is substantially continuous around and encloses the mating cavity 318. The mating contact 310 has an inner surface 316 adjacent to and defining the mating cavity 318. The mating contact 310 has a mating end 312 positioned proximal to the connector 100 in the direction D. In the shown embodiment, the mating end 312 of the mating contact 310 has a chamfer 314 angled in a direction extending into the mating cavity 318.

The mating dielectric housing 320 is disposed in the mating cavity 318 of the mating contact 310, as shown in FIGS. 6-9. The mating dielectric housing 320 is formed of an insulative material.

Figure 6:
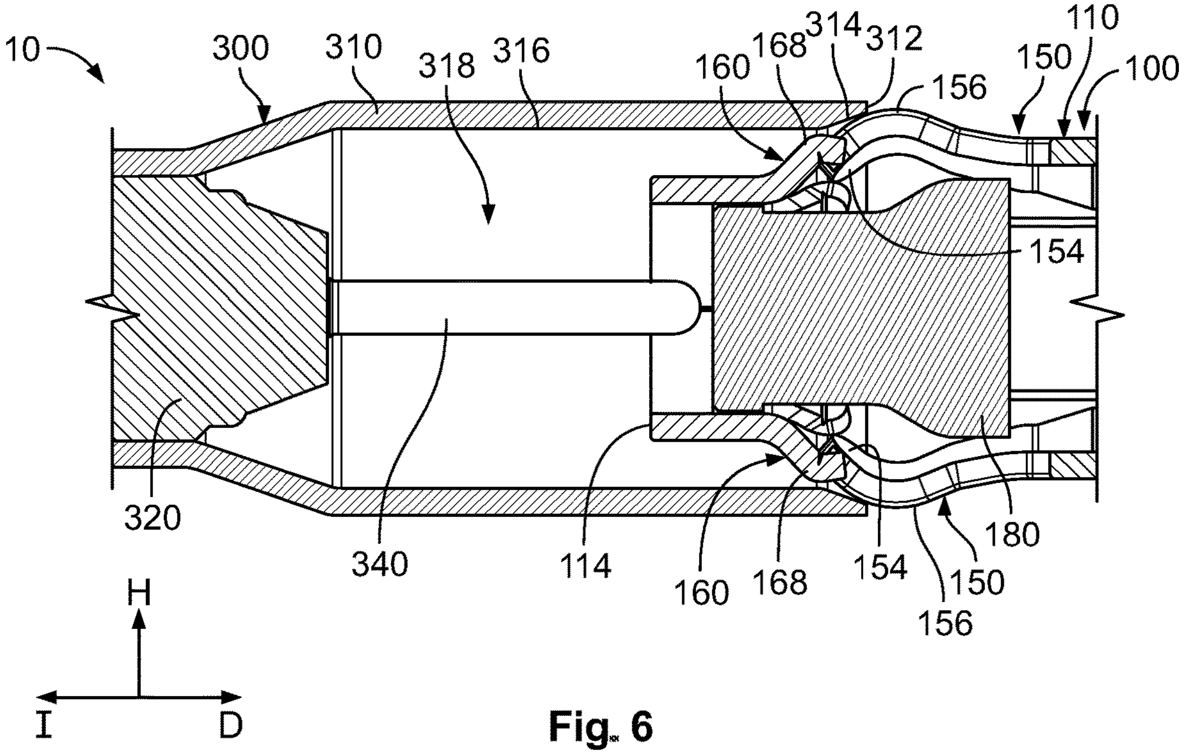
FIG. 6 is a detail sectional view of a connector system including the connector and a mating connector, during insertion of the connector into the mating connector.
Figure 7:
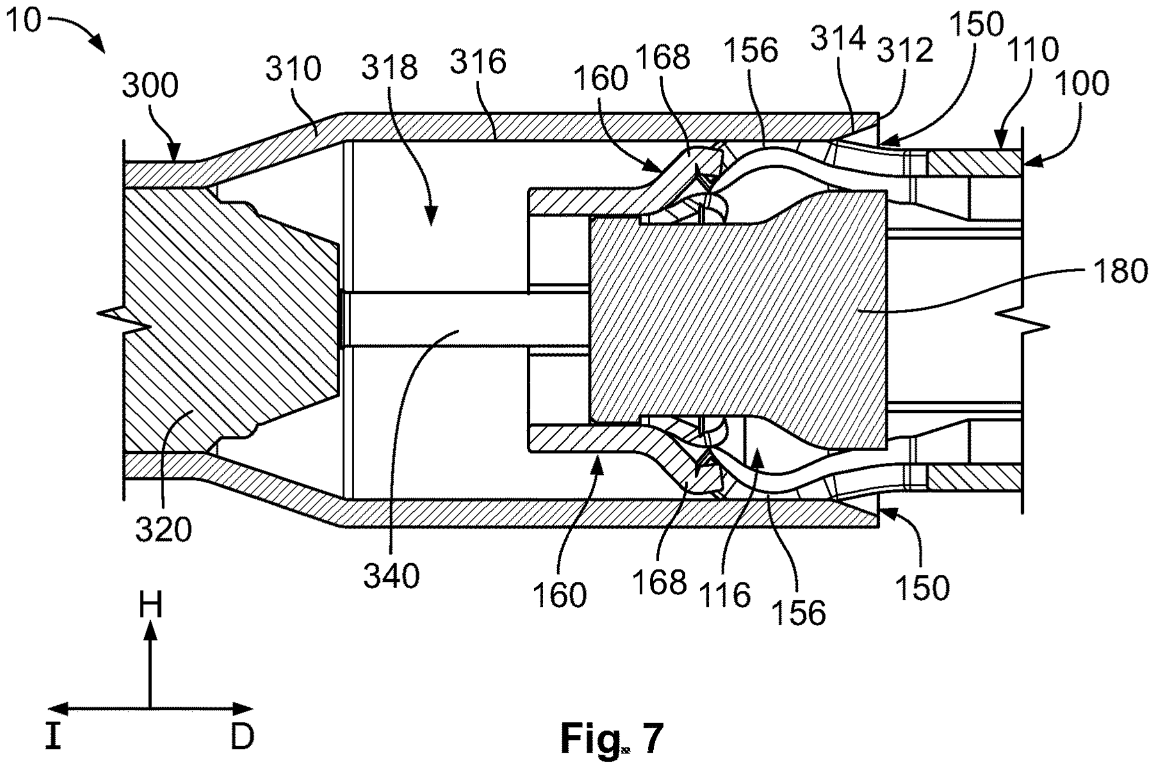
FIG. 7 is a detail sectional view of the connector system during insertion of the connector into the mating connector.
Figure 9:
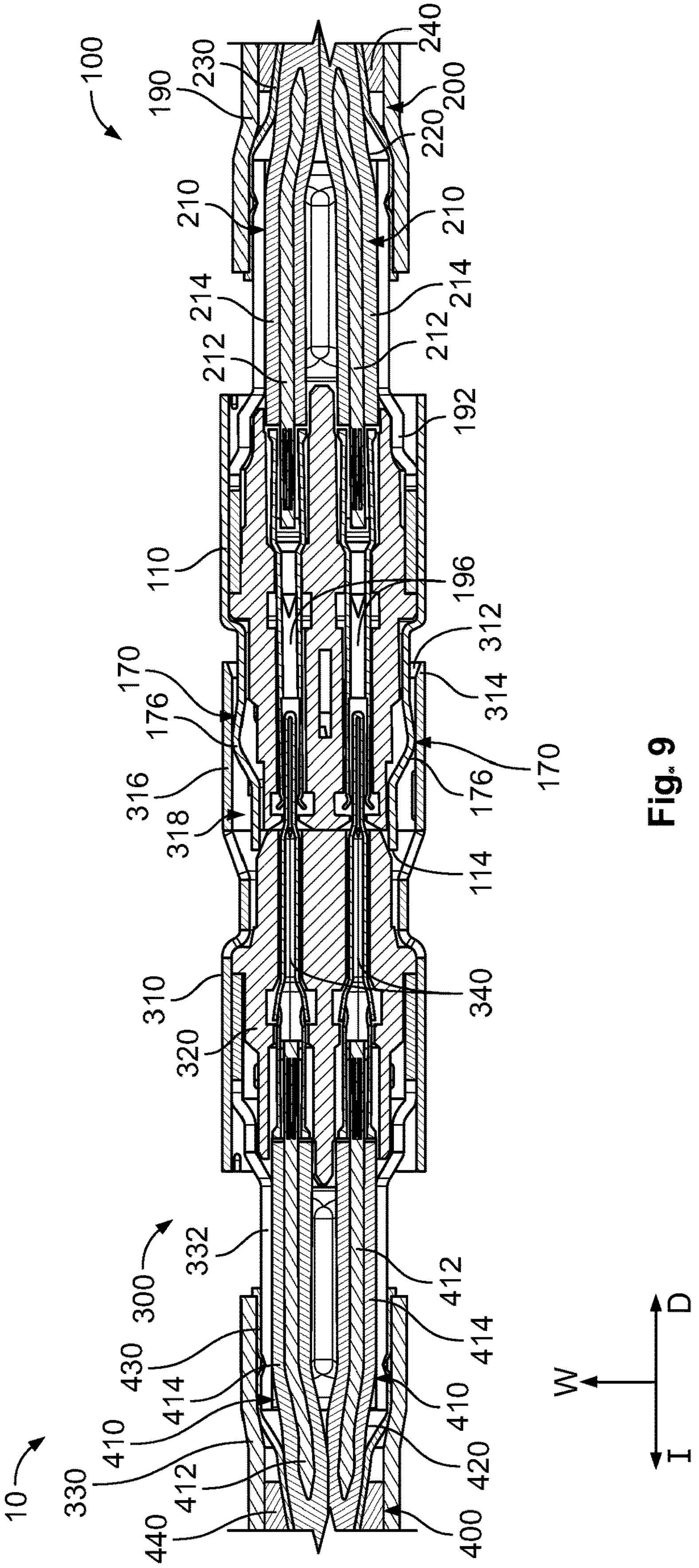
FIG. 9 is a sectional plan view of the connector system with the connector mated with the mating connector.

The mating terminals 340 are held within the mating dielectric housing 320, as shown in FIGS. 6, 7, and 9, and are electrically isolated from the mating contact 310 by the mating dielectric housing 320. The mating terminals 340 are pin terminals in the shown embodiment. In other embodiments, the mating terminals 340 could be receptacle terminals or any other type of terminal used in electrical connectors that is capable of mating and electrically connecting with the terminals 196 of the connector 100.

Figure 8:
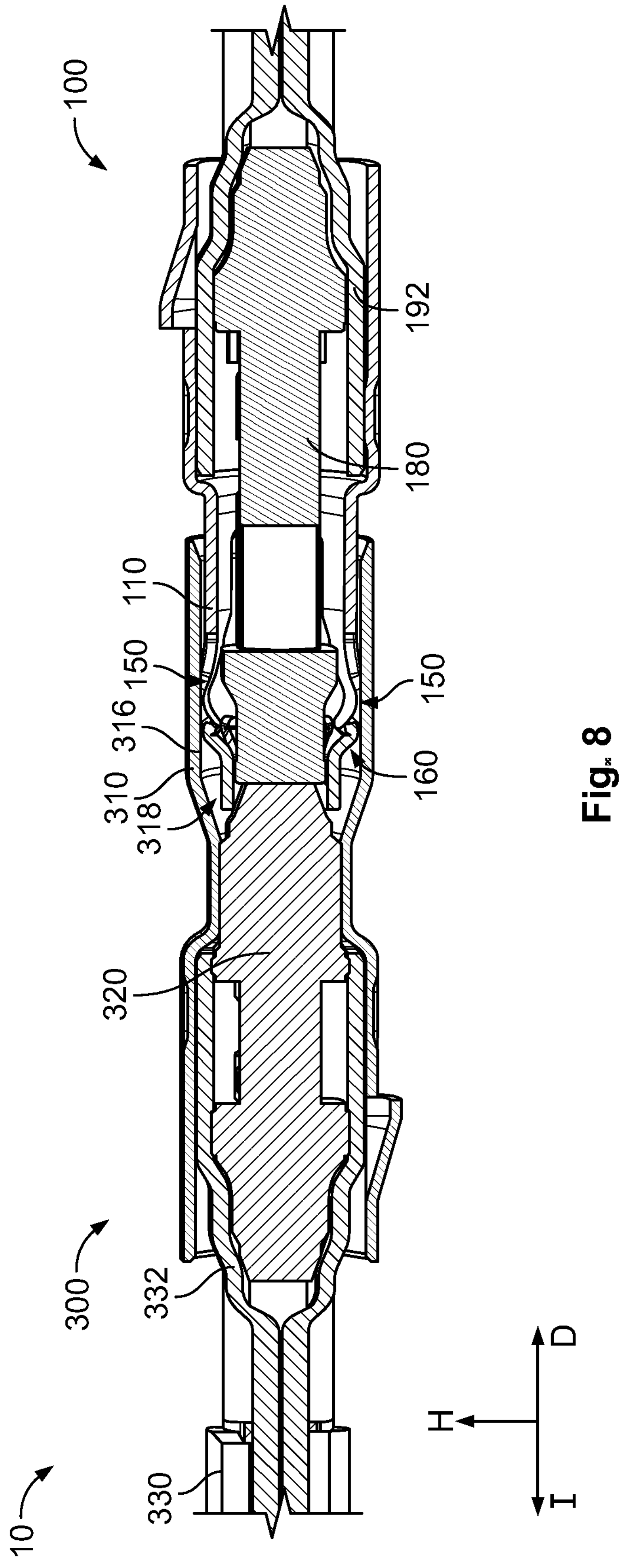
FIG. 8 is a sectional side view of the connector system with the connector mated with the mating connector.

As shown in FIGS. 8 and 9, the mating inner ferrule 332 is disposed around a portion of the mating dielectric housing 320 and partially within the mating cavity 318. The mating inner ferrule 332 is formed of a conductive material and is electrically connected to the mating contact 310. The mating outer ferrule 330 is disposed around an end of the mating inner ferrule 332 opposite the mating contact 310. The mating outer ferrule 330 is formed of a conductive material and is electrically connected to the mating contact 310 via the mating inner ferrule 332.

As shown in FIG. 9, the mating connector 300 is connected to a second cable 400. The second cable 400 is identical to the first cable 200 and is a shielded twisted pair in the shown embodiment. The second cable 400 has a pair of wires 410 each having a conductor 412 and an insulation layer 414 disposed around the conductor 412. The second cable 400 has a foil 420 formed of a conductive material and disposed around the wires 410. In the shown embodiment, the foil 420 is not present at an end of the second cable 400 in a region in which the wires 410 are untwisted and separated from each other. The second cable 400 has a shield 430 formed of a conductive material and disposed around the foil 420 and the wires 410. The shield 430 may also be referred to as a braid. A jacket 440 of the second cable 400, formed of an insulative material, is disposed around the wires 410, the foil 420, and the shield 430. In other embodiments, the second cable 400 can be an unshielded twisted pair, a parallel pair differential cable, or any other type of cable capable of being connected to the mating connector 300.

As shown in FIG. 9, in a region in which the wires 410 are separated from one another and the jacket 440 is stripped or removed, the wires 410 extend through the mating inner ferrule 332 and into the mating dielectric housing 320. The conductor 412 of each of the wires 410 is mechanically and electrically connected to one of the mating terminals 340 in the mating dielectric housing 320, for example by crimping. The wires 410 are electrically isolated from the mating inner ferrule 332 and the mating contact 310 by the insulation layers 414. The shield 430 is disposed around an outer surface of the mating inner ferrule 332 and is electrically and mechanically connected to the mating inner ferrule 332 by the mating outer ferrule 330. The mating outer ferrule 330 is disposed around the second cable 400 and the mating inner ferrule 332 and, in an embodiment, is crimped around the second cable 400 and the mating inner ferrule 332 to secure the second cable 400 and electrically connect the shield 430 to the mating inner ferrule 332. The shield 430 is electrically connected to the mating contact 310 through the mating inner ferrule 332.

The insertion of the connector 100 into the mating connector 300 along the insertion direction I will now be described in detail with reference to FIGS. 6-9.

As shown in FIG. 6, the mating end 114 of the contact 110 of the connector 100 is inserted into the mating cavity 318 of the mating contact 310 of the mating connector 300 along the insertion direction I. As the mating end 114 of the contact 110 is inserted, if the contact 110 is centered within the mating cavity 318, the mating end 312 of the mating contact 310 first contacts each of the cantilever beams 150 near the cantilever contact portion 156.

If the contact 110 is not centered within the mating cavity 318 during insertion along the insertion direction I, the mating end 312 would first contact the protection tabs 160. Because the guard portions 168 of the protection tabs 160 are positioned in front of the beam free ends 154 of the cantilever beams 150 along the insertion direction I and are positioned further from the central longitudinal axis L than the beam free ends 154, the protection tabs 160 protect and prevent the beam free ends 154 from contacting the mating end 312 of the mating contact 310, avoiding damage to the cantilever beams 150. Contact of the mating end 312 with the guard portions 168 of the protection tabs 160 during insertion further guides the mating end 312 along the protection tabs 160, moving the contact 110 into a centered position in the mating cavity 318 shown in FIG. 6.

Upon further insertion of the contact 110 into the mating contact 310 along the insertion direction I from the position shown in FIG. 6, the cantilever beams 150 abut the mating end 312 at the chamfer 314 and are resiliently deformed inward into the dielectric housing receiving space 116 toward the dielectric housing 180, as shown in FIG. 7. The resiliently deformed cantilever beams 150 abut the inner surface 316 of the mating contact 310 with the connected contact portions 176 and electrically connect the contact 110 with the mating contact 310. In the embodiment shown in FIG. 7, the cantilever beams 150 on both an upper side and a lower side of the contact 110 opposite one another in the height direction H abut and electrically contact the inner surface 316 of the mating contact 310.

The connector 100 is shown fully inserted and mated with the mating connector 300 in FIGS. 8 and 9. As shown in FIG. 8, the dielectric housing 180 abuts the mating dielectric housing 320 along the insertion direction I in the mated position. The cantilever beams 150 remain resiliently deflected and in contact with the inner surface 316 of the mating contact 310 in the mated position.

The connected beams 170 of the contact 110 also deflect and contact the inner surface 316 of the mating contact 310. During insertion of the contact 110 into the mating contact 310 along the insertion direction I, the connected beams 170 abut the mating end 312 at the chamfer 314 and are resiliently deformed inward into the dielectric housing receiving space 116 toward the dielectric housing 180. In the mated position shown in FIG. 9, the resiliently deformed connected beams 170 abut the inner surface 316 of the mating contact 310 with the connected contact portions 176 and electrically connect the contact 110 with the mating contact 310. In the embodiment shown in FIG. 9, the connected beams 170 on both lateral sides of the contact 110 opposite one another in a width direction W abut and electrically contact the inner surface 316 of the mating contact 310.

The electrical connection of the contact 110 with the mating contact 310 forms a grounding and shielding connection between the inner ferrule 192 and the outer ferrule 190 of the connector 100, the shield 230 of the first cable 200, the mating inner ferrule 332 and the mating outer ferrule 330 of the mating connector 300, and the shield 430 of the second cable 400. In the mated position of the connector 100 with the mating connector 300, as shown in FIG. 9, the terminals 196 are mated and electrically connected with the mating terminals 340. The electrical connection between the contacts 196, 340 electrically connects the conductors 212, 412 of the cables 200, 400 for the transmission of electrical current or data.

What is claimed is:

1. An electrical contact, comprising:

a cantilever beam extending from a beam connected end connected to a body of the electrical contact to a beam free end along an insertion direction; and a protection tab extending from a tab connected end connected to the body of the electrical contact to a tab free end in a direction opposite to the insertion direction, the tab free end is positioned adjacent to the beam free end, the protection tab has a guard portion on an outer surface of the protection tab between the tab connected end and the tab free end, the guard portion is positioned further from a central longitudinal axis extending centrally through the contact than the beam free end and protects the beam free end of the cantilever beam, the guard portion is not aligned with the cantilever beam along the insertion direction.

2. The electrical contact of claim 1, wherein the body includes a transition section and an end section each extending circumferentially around a dielectric housing receiving space defined by the electrical contact.

3. The electrical contact of claim 2, wherein the transition section and the end section are separated from another along the insertion direction.

4. The electrical contact of claim 3, wherein the beam connected end is connected to the transition section and the cantilever beam extends away from the transition section along the insertion direction.

5. The electrical contact of claim 4, wherein the tab connected end is connected to the end section and the protection tab extends away from the end section in the direction opposite to the insertion direction.

6. The electrical contact of claim 5, further comprising a connected beam extending along the insertion direction, the connected beam has a first end connected to the transition section and a second end connected to the end section.

7. The electrical contact of claim 6, wherein the connected beam has a connected contact portion between the first end and the second end, the connected contact portion is positioned further from the central longitudinal axis extending centrally through the electrical contact than the first end and the second end.

8. The electrical contact of claim 5, wherein the cantilever beam is one of a plurality of cantilever beams extending along the insertion direction from a top side and a bottom side of the transition section.

9. The electrical contact of claim 8, wherein the protection tab is one of a plurality of protection tabs extending in the direction opposite to the insertion direction from a top side and a bottom side of the end section.

10. The electrical contact of claim 9, wherein the tab free end of at least one of the protection tabs is positioned between a plurality of beam free ends of the cantilever beams along a width axis perpendicular to the insertion direction.

11. The electrical contact of claim 9, further comprising a plurality of connected beams extending along the insertion direction and each connected between a lateral side of the transition section and a lateral side of the end section.

12. The electrical contact of claim 1, wherein the guard portion is formed by a bend in the protection tab between the tab connected end and the tab free end.

13. The electrical contact of claim 1, wherein the guard portion is positioned in front of the beam free end along the insertion direction.

14. The electrical contact of claim 1, wherein the cantilever beam has a cantilever contact portion between the beam connected end and the beam free end, the guard portion is positioned closer to the central longitudinal axis than the cantilever contact portion.

15. The electrical contact of claim 1, wherein the cantilever beam and the protection tab are monolithically formed in a single piece.

16. An electrical connector, comprising:

an electrical contact having a cantilever beam extending from a beam connected end connected to a body of the electrical contact to a beam free end along an insertion direction and a protection tab extending from a tab connected end connected to the body of the electrical contact to a tab free end in a direction opposite to the insertion direction, the tab free end is positioned adjacent to the beam free end, the protection tab has a guard portion on an outer surface of the protection tab between the tab connected end and the tab free end, the guard portion is positioned further from a central longitudinal axis extending centrally through the electrical contact than the beam free end and is deflectable toward and away from the central longitudinal axis, the guard portion is not aligned with the cantilever beam along the insertion direction.

17. The electrical connector of claim 16, further comprising a dielectric housing disposed within the electrical contact and an inner ferrule disposed around the dielectric housing, the inner ferrule is electrically connected to the electrical contact.

18. An electrical connector system, comprising:

an electrical connector including an electrical contact having a cantilever beam extending from a beam connected end connected to a body of the electrical contact to a beam free end along an insertion direction and a protection tab extending from a tab connected end connected to the body of the electrical contact to a tab free end in a direction opposite to the insertion direction, the tab free end is positioned adjacent to the beam free end, the protection tab has a guard portion on an outer surface of the protection tab between the tab connected end and the tab free end, the guard portion is positioned further from a central longitudinal axis extending centrally through the electrical contact than the beam free end, the guard portion is not aligned with the cantilever beam along the insertion direction; and a mating connector including a mating contact, the mating contact is electrically connected to the electrical contact when the electrical connector is mated with the mating connector, the guard portion of the protection tab prevents the mating contact from contacting the beam free end of the cantilever beam.

19. An electrical contact, comprising:

a plurality of cantilever beams each extending from a beam connected end connected to a body of the electrical contact to a beam free end along an insertion direction; and a plurality of protection tabs each extending from a tab connected end connected to the body of the electrical contact to a tab free end in a direction opposite to the insertion direction, the tab free end of each of the protection tabs is positioned adjacent to the beam free end of at least one of the cantilever beams, the tab free end of at least one of the protection tabs is positioned between a plurality of beam free ends of the cantilever beams along a width axis perpendicular to the insertion direction.

* * * * *